United States Patent
L'Her

(10) Patent No.: US 9,557,428 B2
(45) Date of Patent: Jan. 31, 2017

(54) METHOD FOR CONTROLLING QUALITY OF OPERATION OF A PAM SYSTEM, CORRESPONDING COMPUTER PROGRAM PRODUCT, NON-TRANSITORY COMPUTER-READABLE CARRIER MEDIUM AND QUALITY CONTROL DEVICE

(71) Applicant: SERCEL, Carquefou (FR)

(72) Inventor: Christophe L'Her, Loperhet (FR)

(73) Assignee: SERCEL, Carquefou (FR)

( * ) Notice: Subject to any disclaimer, the term of this patent is extended or adjusted under 35 U.S.C. 154(b) by 156 days.

(21) Appl. No.: 14/474,741

(22) Filed: Sep. 2, 2014

(65) Prior Publication Data

US 2015/0260861 A1    Sep. 17, 2015

Related U.S. Application Data

(60) Provisional application No. 61/951,873, filed on Mar. 12, 2014.

(51) Int. Cl.
*G01V 1/00* (2006.01)
*G01V 1/02* (2006.01)
*G01V 1/38* (2006.01)

(52) U.S. Cl.
CPC ................. *G01V 1/001* (2013.01); *G01V 1/02* (2013.01); *G01V 1/38* (2013.01); *G01V 2200/14* (2013.01)

(58) Field of Classification Search
CPC ...... G01V 1/001; G01V 1/02; G01V 2200/14; G01V 1/38

(Continued)

(56) References Cited

U.S. PATENT DOCUMENTS 4,509,151 A    4/1985   Anderson
7,974,151 B2   7/2011   Iranpour et al.
(Continued)

FOREIGN PATENT DOCUMENTS

NO    WO 9634298 A1 *  10/1996  ............. G01S 3/023
WO       9634298 A1     10/1996

OTHER PUBLICATIONS

Clark, et al., "Calibration and comparison of the acoustic location methods used during the spring migration of the bowhead whale, *Balaena mysticetus*, off Pt. Barrow, Alaska, 1984-1993," J. Acoust. Soc. Am. 107 (6), Jun. 2000, pp. 3509-3517.*

(Continued)

*Primary Examiner* — Daniel L Murphy
(74) *Attorney, Agent, or Firm* — David D. Brush; Westman, Champlin & Koehler, P.A.

(57) ABSTRACT

A method is provided for controlling quality of operation of a passive acoustic monitoring system. The method includes, at least for one given source: (a) the given source emits at least one acoustic test signal; (b) the passive acoustic monitoring system obtains acoustic signal measurements and estimates at least one parameter, characteristic of and/or associated with the at least one test acoustic signal, as a function of the acoustic signal measurements; (c) comparing the at least one estimated parameter with at least one reference parameter, characteristic of and/or associated with the at least one test acoustic signal; (d) obtaining at least one piece of quality information, as a function of results of the comparing step. A quality control device is provided, which drives the given source to trigger the step (a), obtains the at least one estimated parameter and carries out the steps (c) and (d).

13 Claims, 2 Drawing Sheets

(58) Field of Classification Search
 USPC .................................................. 367/13, 15
 See application file for complete search history.

(56) References Cited

U.S. PATENT DOCUMENTS

| | | |
|---|---|---|
| 2005/0278158 A1 | 12/2005 | Ellison et al. |
| 2009/0251991 A1 | 10/2009 | Ayela et al. |
| 2010/0278010 A1 | 11/2010 | Gubin et al. |
| 2010/0290316 A1 | 11/2010 | Caudal et al. |
| 2012/0120760 A1 | 5/2012 | Groenaas et al. |
| 2014/0293749 A1 | 10/2014 | Gervaise |
| 2014/0376334 A1 | 12/2014 | Fillinger et al. |

OTHER PUBLICATIONS

Simard Y., 2009. "Passive Acoustic Monitoring During Seismic Surveys". DFO Can. Sci. Advis. Sec. Res. Doc. 2009/068.

European Search Report and Written Opinion dated Jan. 4, 2016 for corresponding European Application No. 15156339.

Clark et al., "Calibration and comparison of the acoustic location methods used during the spring migration of the bowhead whale, *Balaena mysticetus*, off Pt. Barrow, Alaska, 1984-1993", The Journal of the Acoustical Society of America, American Institute of Physics for the Acoustical Society of America, New York, NY, US, vol. 107, No. 6, Jun. 2000 (Jun. 2006), pp. 3509-3517, XP012001758.

Thomas et al., "Linking the sounds of dolphins to their locations and behavior using video and multichannel acoustic recordings", The Journal of the Acoustical Society of America, American Institute of Physics or the Acoustical Society of America, New York, NY, US, vol. 112, No. 4, Oct. 2002 (Oct. 2002), pp. 1692-1701, XP012003106.

\* cited by examiner

METHOD FOR CONTROLLING QUALITY OF OPERATION OF A PAM SYSTEM, CORRESPONDING COMPUTER PROGRAM PRODUCT, NON-TRANSITORY COMPUTER-READABLE CARRIER MEDIUM AND QUALITY CONTROL DEVICE

1. CROSS-REFERENCE TO RELATED APPLICATION

The present application is based on and claims the benefit of U.S. provisional patent application Ser. No. 61/951,873, filed Mar. 12, 2014, the content of which is hereby incorporated by reference in its entirety.

2. FIELD OF THE INVENTION

The field of the invention is that of passive acoustic monitoring. It deals with the equipments required in order to respect constraints imposed by regulating agencies which aim to protect marine mammal life.

More specifically, the invention pertains to a technique for automatically evaluating quality of operation of passive acoustic monitoring system, hereafter called PAM system.

Underwater passive acoustic monitoring is a non-intrusive technique that can be used to detect, classify and localize (DCL) marine mammals.

It should be noted that if a PAM system allows to listen and detect acoustics signals of biological origin, it can also listen and detect any undesired sound contribution created by other activities.

The invention relates to marine seismic survey, but can be of interest for any other field which requires a system performing marine mammal's monitoring in a marine environment.

3. TECHNOLOGICAL BACKGROUND

It is sought more particularly here below in this document to describe problems existing in the field of geophysical data acquisition for analysing the sea-bed (e.g. for oil exploration industry using seismic prospection method). The invention of course is not limited to this particular field of application but is of interest for any technique for performing quality control of measurements of marine mammal vocalization that has to cope with closely related or similar issues and problems.

Regulation agencies encourage or impose the use of a PAM system during seismic survey campaigns. These regulating agencies propose guidelines defining rules to apply during seismic campaigns in order to protect the marine mammals. In particular the guidelines recommend the PAM system to detect the presence of marine mammals in the vicinity of seismic sources, which can be considered as injurious to the marine mammal life (e.g. acoustic disturbances).

In the prior art, a PAM system typically comprises a network of acoustic sensors, such as hydrophones or geophones or accelerometers or vector sensors, arranged along one or several linear acoustic antennas (hereafter referred to "streamers") towed by a vessel, and adapted for detecting and measuring vocalizations, i.e. acoustic signals emitted by marine mammals. When a marine mammal vocalizes in the vicinity of the network of seismic sensors, these sensors make measurements of the acoustic signal or signals emitted by the marine mammal. A localization computation is then performed from the measurement data collected by the sensors to determine the localization of the marine mammal from the seismic sources.

There are two known families of PAM systems used by the oil prospecting companies:
  the integrated PAM systems, which rely on the use of a network of seismic sensors distributed on the streamers towed by the seismic vessel, which seismic sensors being originally adapted to perform geophysics data acquisition, and thus diverted of its function first to make passive acoustic monitoring;
  the independent PAM systems, which rely on the use of a network of dedicated acoustic sensors arranged along a linear acoustic line, which is deployed and towed in addition to the existing streamers behind the seismic vessel and entirely dedicated to the passive acoustic monitoring.

Nowadays, regulating agencies and stakeholders in marine survey operations establish codes of conduct which suggest demonstrating the capabilities of a PAM system to detect, classify and localize the mammal species likely to be encountered in the survey area during the planning phase of a seismic survey.

The lack of knowledge on the performances of the different devices of a PAM system can reduce the accuracy or usefulness of the collected acoustic data by the sensors. Since seismic surveys can be quite time-consuming, there is a need to evaluating, as the survey progresses, the quality of operation of the PAM system. This is referred hereafter to as "quality control" or "QC".

Moreover, the guidelines also suggest testing the quality of operation of the towed streamers before each deployment to ensure that no malfunction exists. This simply consists in verifying that the sensors of the towed streamers properly work and are well connected thanks to a so called "tap test", which is done with manually tapping the sensors and verifying they detect such tapping.

In the prior art, a known method for controlling quality of operation of a PAM system during fieldwork consist in measuring background noise during the seismic survey. At low frequency, the background noise is preponderant on the electronics of components, so measuring the background noise allows checking the integrity of the whole data acquisition chain in the towed streamers, and detecting a possible failure of a sensor.

However, this known method is carried out irregularly and requires on the assumption that the background noise remains relatively constant during the seismic survey. In addition, opportunity acoustic sources, the vessel noise and the noise caused by the seismic source firing are used to build performance indicators of the acoustic reception chain. However, as none of these sources are accurately characterized (in particular emission level versus frequency), this method only permits to check that the acoustic measurements are globally representatives. This does not therefore provide satisfactory quality information. Lastly, if a sensor were in default from the start of the survey, this one would not be identified by that background noise test.

In summary, this known method only provides a rough idea of the level of quality of operation of the PAM system.

Another known method of control of quality of a PAM system is based on the use of a source emitting a test acoustic signal simulating a vocalization of a marine mammal. This source is immerged at a known location and depth. This method of control of quality of a PAM system can be summarized as follow:

a first operator on the source side triggers the source to emit a test acoustic signal;

the PAM system obtains acoustic signal measurements;

a second operator on the PAM system side carries out the following steps:

estimates parameters, characteristic of and/or associated with the test acoustic signal, as a function of the obtained acoustic signal measurements;

compares the estimated parameter with reference parameters characteristic of and/or associated with the test acoustic signal;

obtains at least one piece of quality information, as a function of results of the comparing step.

The reference parameters belongs to the group comprising:

characteristics of the test acoustic signal (such as the emission level, the signal shape, the bandwidth, the centre frequency, etc.);

an emission time of the test acoustic signal; and an emission location of the at least one source.

However, this known method is fastidious, as it requires the presence of an operator on simulator side and an operator on PAM system side, the operators carrying out the different steps of the process manually. This involves the presence of experienced operators, especially on the PAM system side where the calculations of quality control are carried out by hand. As data are collected in different locations and different formats, the validation process is further heavy and takes time.

In addition, owing to the frequency bandwidth used by the seismic sources, such known method is highly sensitive to phenomena of masking of sensors. Indeed, frequency bandwidth of vocalizations emitted by marine mammals can be, at least partially, common with the frequency bandwidth used by the seismic sources. Then, the detection range for a given marine mammal is highly reduced if its vocalizations illuminate the sensors during a seismic shooting session. This masking phenomenon being not taken into consideration in the known method, quality control results are highly variable and therefore not always reliable.

4. SUMMARY

A particular embodiment of the invention proposes a method for controlling quality of operation of passive acoustic monitoring system, said method comprising, at least for one given source:

a) said given source emits at least one acoustic test signal;

b) the passive acoustic monitoring system obtains acoustic signal measurements and estimates at least one parameter, characteristic of and/or associated with said at least one test acoustic signal, as a function of said acoustic signal measurements;

c) comparing the at least one estimated parameter with at least one reference parameter, characteristic of and/or associated with said at least one test acoustic signal;

d) obtaining at least one piece of quality information, as a function of results of said comparing step.

The method is such that a quality control device carries out the following steps:

1) drives said given source to trigger said step a);
2) obtains said at least one estimated parameter; and
3) carries out said steps c) and d).

Thus an exemplary embodiment of the invention relies on a fully automatic method of controlling quality of operation of a passive acoustic monitoring system, which does not require any operators either source side or PAM system side.

To that end, an exemplary embodiment of the invention is based on the implementation of a quality control device responsible for driving at least one given source and synchronizing the at least one given source with the acoustic signal measurements carried out by the PAM system on the one hand, and for carrying out the control of quality of operation of the passive acoustic monitoring system, on the other hand. Said at least one piece of quality information obtained can be then used to calibrate the passive acoustic monitoring system with accuracy.

According to a particular feature, said quality control device belongs to the group comprising:

a quality control device integrated in said passive acoustic monitoring system;

a quality control device integrated in said given source; and a quality control device independent of said passive acoustic monitoring system and said given source.

Thus, an exemplary embodiment of the invention provides for several embodiments in which the quality control device can be integrated either in the passive acoustic monitoring system or in the given source, or in which it can be independent from the passive acoustic monitoring system and given source. In last case, this allows a real time running of the method in an autonomous independent device.

According to a particularly advantageous feature, a navigation system implements a seismic shooting session, and said quality control device carries out a synchronization of said step of driving the given source, with said seismic shooting session.

The seismic source shots during survey produces disturbances (masking phenomena) liable to affect the acoustic signals measurements performed by the PAM system. By taking into account the seismic shooting session, it is thus possible to identify and characterize abiotic signals (due to seismic apparatus) in the acoustic signal measurements and thereby to take them into consideration in the step of estimating parameters. As a consequence, the quality information obtained according to an exemplary embodiment of the invention are more reliable than the quality information obtained by the prior art methods.

According to a particular feature, the seismic shooting session comprises at least one shooting time slot and at least one non-shooting time slot, and wherein said synchronization of said step of driving the given source, with said seismic shooting session, is such that said at least one test acoustic signal is emitted either during said at least one shooting time slot or during said at least one non-shooting time slot.

The interest to have a piece of information during a shooting time slot and a piece of information during a non-shooting time slot is that it enables the quality control device to characterize accurately the impact of the seismic source shots on the acoustic signals measurements during seismic surveys.

According to a particular feature, an iteration of said steps a) to d) is carried out for each of at least two sources, each source is located in a distinct location, and said quality control device carries out said steps 1) to 3) for each of said at least two sources.

As the reception radiation pattern of the PAM system is not homogenous, an astute choice of location of the different sources as a function of the reception radiation pattern can be carried out in the quality control process, in order to enhance the functioning of the PAM system. Indeed, in practice, certain areas of the sensing coverage of sensors are more or less sensitive (due to the radiation pattern and the geographic configuration of the network of sensors in the PAM system).

According to a variant, an iteration of said steps a) to d) is carried out for each of at least two sources, each source using a distinct emission frequency range, and said quality control device carries out, simultaneously for said at least two sources, said steps 1) to 3).

This enables to execute multiple quality control processes in parallel.

According to a particular feature, said given source belongs to the group comprising:
- a marine mammal vocalization simulator;
- a marine seismic source;
- a marine depth-sounder; and
- a marine transponder.

The marine seismic source (such as an airgun or watergun used in marine seismic exploration), depth-sounder and transponder can be diverted from their original use to perform the emission of test acoustic signal, driven by the quality control device.

The given source, as function of its nature, can be installed anywhere on the overall system used for the seismic prospection, i.e. on a vessel, on a head buoy or end-tail buoy (towed, moored or drifting), on the seismic source network, or integrated on or inside the seismic streamers. The vocalization simulator can be installed on an independent device such as an underwater unmanned vehicle eventually equipped with seismic equipments, an ocean bottom node disposed on the seafloor, or on a dedicated device immerged at known location and depth from the PAM system.

According to a particular feature, said at least one reference parameter belongs to the group comprising:
- characteristics of said at least one test acoustic signal;
- an emission time of said at least one test acoustic signal; and
- an emission location of said at least one source.

The characteristics of said at least one test acoustic signal comprises notably the signal shape (e.g. to simulate whistle, clicks, train clicks, moan), the emission level, the emission frequencies range, the central frequency, the emission duration.

According to a particular feature, at least two iterations of said steps a) to d) and said steps 1) to 3) are carried out for said given source, with at least one characteristic of said at least one test acoustic signal which is different for each iteration.

This enables the quality control device to test different characteristics of acoustic signal and therefore to evaluate the quality of operation of the PAM system for different characteristics of acoustic signal.

According to a particularly advantageous variant, at least two iterations of said steps a) to d) and said steps 1) to 3) are carried out for said given source, with at least one characteristic defining said step of obtaining acoustic signal measurements which is different for each iteration.

The quality control device adjusts automatically some of the characteristics defining said step of obtaining acoustic signal measurements by means of an optimization process.

According to a particularly advantageous feature, at least two iterations of said steps b) to d) and said steps 2) to 3) are carried out for said given source, with at least one characteristic defining said step of estimating which is different for each iteration.

The quality control device adjusts automatically some of characteristics defining said step of estimating by means of an optimization process, which consists here in replaying measurements acquired by the PAM system after having changed at least one characteristic defining said step of estimating.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

In another embodiment, the invention pertains to a quality control device adapted to control quality of operation of a passive acoustic monitoring system (10), characterized in that it comprises:
- means for driving a given source to trigger emission of at least one acoustic test signal by said given source;
- means for obtaining at least one parameter, characteristic of and/or associated with said at least one test acoustic signal, estimated by the passive acoustic monitoring system as a function of acoustic signal measurements obtained by the passive acoustic monitoring system;
- means for comparing the at least one estimated parameter with at least one reference parameter, characteristic of and/or associated with said at least one test acoustic signal;
- means for obtaining at least one piece of quality information, as a function of results delivered by said comparing means.

Advantageously, the quality control device comprises means for implementing the steps it performs in the quality control process as described above, in any of its various embodiments.

5. LIST OF FIGURES

Other features and advantages of embodiments of the invention shall appear from the following description, given by way of an indicative and non-exhaustive examples and from the appended drawings, of which:

6. DETAILED DESCRIPTION

In all of the figures of the present document, identical elements and steps are designated by the same numerical reference sign.

In the example described below, we consider the control of quality of operation of a PAM system in the context of a sea oil survey.

Figure 1:
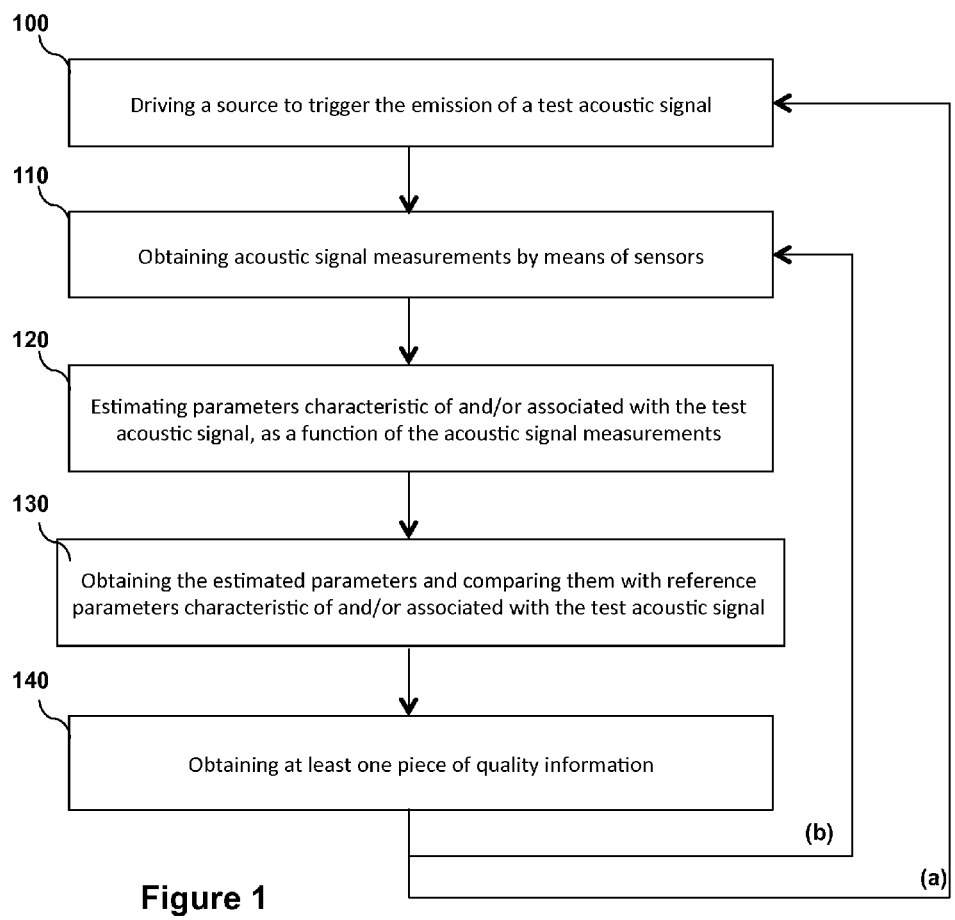
FIG. 1 is a flowchart of a particular embodiment of the method according to the invention.

Referring now to FIG. 1, we present a quality control method according to a particular embodiment of the invention. A part of the method is carried out by a quality control device (the principle of which is described in detail below in relation with FIG. 5).

Figure 2:
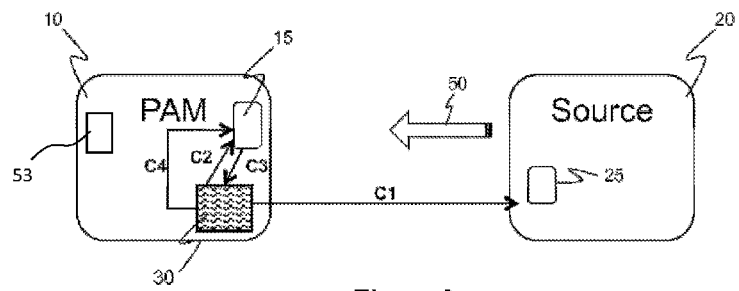
FIG. 2 represents a schematic illustration of the principle of functioning of the method according to a first embodiment of the invention.
Figure 3:
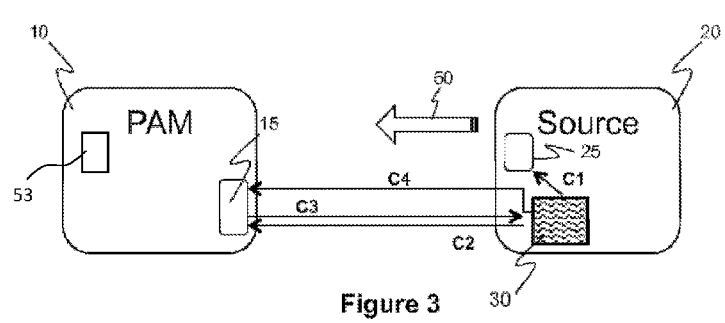
FIG. 3 represents a schematic illustration of the principle of functioning of the method according to a second embodiment of the invention.
Figure 4:
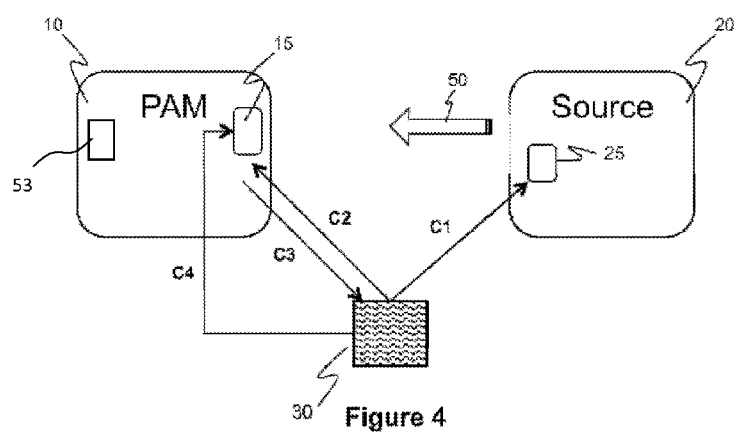
FIG. 4 represents a schematic illustration of the principle of functioning of the method according to a third embodiment of the invention.

As illustrated on FIGS. 2 to 4, we consider a PAM system 10 comprising a network of acoustic sensors, which carries out continuous measurements of acoustic signals. The acoustic sensors are arranged along a plurality of streamers towed by a seismic vessel. The acoustic sensors 53 are of the following type: hydrophones and/or accelerometers and/or vector sensors (i.e. couples of geophones). We also consider a remote source 20 adapted to emit test acoustic signals. In the present example, the remote source 20 is a simulator of marine mammal vocalizations, which is immerged at a known location and depth from the PAM system 10. The "wave filled" square labeled 30 illustrates the quality control device. The PAM system 10, the remote source 20 and the quality control device 30 are necessary to implement the method according to an exemplary embodiment of the invention.

In FIG. 2 (first embodiment), the quality control device 30 is integrated in the PAM system 10. In FIG. 3 (second embodiment), the quality control device 30 is integrated in the source 20. In FIG. 4 (third embodiment), the quality control device 30 is independent from the source 20 and the PAM system 10.

The method according to an exemplary embodiment of the invention is fully automatic and does not require any operators either source side or PAM system side.

First Embodiment

FIG. 2

The quality control method is first described below through the particular embodiment of FIG. 2. In that particular embodiment, the PAM system 10 is master and the source 20 is slave.

The quality control method is initialized by the device 30, which remotely drives the source 20 from the PAM system 10. The source 20 is remote-controlled by the device 30 by means of commands transmitted via wireless communication means, such as a radio frequency link for example.

In step 100, the device 30 transmits an emission command C1 to the source 20 in order to trigger the emission of a test acoustic signal. Upon reception of the emission command C1, the source 20 emits a test acoustic signal 50 in the surrounding water.

At the same time, the device 30 transmits a measurement command C2 to the PAM system 10 in order to trigger the execution of acoustic signal measurements synchronously with the emission of the test acoustic signal 50 by the source 20.

In this particular embodiment, the emission command C1 is an external command transmitted from the PAM system 10 to the remote source 20, to remotely trigger the emission of the test acoustic signal 50. The measurement command C2 is an internal command transmitted from the device 30 to the control unit 15 of PAM system 10, both device 30 and control unit 15 being comprised in the PAM system 10.

The aim is to synchronize the emission of the test acoustic signal 50 by the source 20 with the acoustic signal measurements carried out by the PAM system 10. The synchronous implementation between the test acoustic signal emission and the signal measurements is given here for illustrative purposes only. Other implementations are possible without departing from the scope of the invention. By example, it could be implemented a starting of signal measurements before triggering the test acoustic signal 50, then a resynchronization of the signal measurements in post-processing.

The test acoustic signal 50 is associated with a set of reference parameters which is characteristic of and/or associated with the test acoustic signal emitted, and notably:

reference characteristics of the test acoustic signal 50, such as the emission level, the signal shape, the bandwidth, the centre frequency, etc.;

a emission time of the test acoustic signal 50; and a emission location of the source 20.

The reference parameters are defined by the device 30 and stored in its data memory. They enable the device 30 to configure the test acoustic signal 50 to emit.

By way of illustration, the test acoustic signal 50 emitted by the source 20 represents a synthesized vocalization of an odontocetes for example whose the characteristics are followings: whistles-shaped signal, medium emission frequencies comprised between 12 kHz and 20 kHz for simulating a bottlenosed dolphin for instance.

In step 110, the PAM system 10 previously activated by the device 30 obtains acoustic signal measurements of the test acoustic signal 50 emitted by the source 20, by means of the network of acoustic sensors.

In step 120, the PAM system then estimates parameters characteristic of and/or associated with the test acoustic signal 50, as a function of the acoustic signal measurements obtained in step 110, namely:

estimated characteristics of the test acoustic signal 50, such as the emission level, the signal shape, the bandwidth, the central frequency, etc.;

estimated emission time of the test acoustic signal 50; and estimated emission location of the source 20.

In step 130, the device 30 first collects the parameters estimated by the PAM system 10 (communication illustrated by the arrow C3), then compares the estimated parameters with the aforesaid set of reference parameters, in order to deduce information on quality of operation of the PAM system 10.

In step 140, the device 30 obtains quality information as a function of results of the comparing step 130. The quality information are then sent to the control unit 15 of the PAM system (communication illustrated by the arrow C4).

This particular embodiment implies establishing, in step 130, an internal communication C3 to enable the device 30 to obtain the parameters estimated by the PAM system 10 from the control unit 15 and, in step 140, an internal communication C4 to enable the device 30 to provide the PAM system 10 with the quality information determined by the device 30 via the control unit 15.

Second Embodiment

FIG. 3

In that particular embodiment, the quality control device 30 is integrated in the source 20. The source 20 is master and the PAM system 10 is slave.

In step 100, the quality control method is initialized by the device 30, which drives the source 20 from the source itself by means of an internal emission command C1 sent to the control unit 25 of the source 20. Thus, contrary to the first embodiment, it is an internal command that triggers the emission of a test acoustic signal in step 100. Upon reception of the internal emission command C1, the source 20 emits a test acoustic signal 50 in the surrounding water.

In parallel, the device 30 transmits a measurement command C2 to the control unit 15 of the PAM system 10 in order to remotely trigger the execution of acoustic signal measurements synchronously with the emission of the test acoustic signal 50 by the source 20. Thus, contrary to the first embodiment, it is an external command that triggers, in step 100, the acoustic signal measurements of the PAM system 10.

A variant of this embodiment, in step 100, consists in triggering the execution of acoustic signal measurements performed by the PAM system 10, by sending a pre-test acoustic signal from the source 20 to the PAM system 10, or by inserting in the test acoustic signal 50 itself, a specific data block or a specific pattern giving instructions to the PAM system 10 to trigger acoustic signal measurements at a given time.

In step 130, this particular embodiment implies establishing an external communication C3 between the control unit 15 of the PAM system 10 and the device 30 integrated in the source 20, to enable the device 30 to obtain the parameters estimated by the PAM system 10.

In step 140, this particular embodiment implies establishing an external communication C4 between the device 30 integrated in the source 20 and the control unit 15 of the PAM system 10, to enable the device 30 to provide the PAM system 10 with the quality information obtained by the device 30.

Third Embodiment

In that particular embodiment (FIG. 4), the quality control device 30 is independent from the source 20 and the PAM system 10, and manages the steps 100, 130 and 140 of the method thanks to external commands transmitted between the different entities, via radiocommunication means for example.

The quality control method is initialized by the device 30, which remotely drives the source 20.

In step 100, the device 30 transmits an external emission command C1 to the control unit 25 of the source 20 in order to trigger the emission of a test acoustic signal. Upon reception of the emission command C1, the source 20 emits a test acoustic signal 50 in the surrounding water.

In parallel, the device 30 transmits an external measurement command C2 to the control unit 15 of the PAM system 10 in order to trigger the execution of acoustic signal measurements synchronously with the emission of the test acoustic signal 50 by the source 20.

In step 130, the device 30 collects the parameters estimated by the PAM system 10 by means of a communication C3 established between the device 30 and the control unit 15 of the PAM system 10, then compares the estimated parameters with the aforesaid reference parameters.

In step 140, the device 30 obtains quality information as a function of results of the comparing step 130 and sent them to the PAM system 10 by means of a communication C4 established between the device 30 and the control unit 15 of the PAM system 10.

According to a particular feature of an exemplary embodiment of the invention, we may envisage that several iterations of the steps 100 to 140 (loop (a) in FIG. 1) are carried out for the source 20, with characteristics of the test acoustic signal which are different for each iteration. The quality control device 30 can therefore test different characteristics of acoustic signal to evaluate the quality of operation of the PAM system for different characteristics of acoustic signal.

According to a particularly advantageous feature of an exemplary embodiment of the invention, the quality control device 30 further cooperates with the navigation system to take into account the seismic shooting session implemented by the navigation system (not shown on figures). The navigation system trigs the seismic source shots (i.e. airguns shots) and the acoustic positioning system of the streamers. During seismic survey, the seismic source shots can produce disturbances (masking phenomena) liable to affect the acoustic signal measurements performed by the PAM system 10. To that end, the device 30 carries out, in step 100, a synchronization of the step of driving the source 20 with the seismic shooting session. More particularly a seismic shooting session comprises several shooting time slots and several non-shooting time slots, and the synchronization of the step 100 of driving the source 20 is performed such that the test acoustic signal 50 is emitted either during said one of the shooting time slots or during one of the non-shooting time slots. By taking into account the shooting time slots and non-shooting time slots, it is possible to identify and characterize abiotic signals (due to seismic apparatus) in the acoustic signal measurements and therefore to characterize accurately the impact of the seismic source shots on the acoustic signals measurements during seismic surveys, which is not possible with prior art methods.

Moreover, as the bandwidth of the emitted signals by the source 20 is important (e.g. from hundred of hertz to hundred of kilohertz), the synchronization with the seismic shooting session ensures the compatibility between the different acoustic systems (navigation and PAM systems). Indeed, the method allows using the source 20 without interfering with the seismic operations, i.e. the quality control device 30 is able to operate in between two seismic acquisitions driven by the navigation system. In this way, the sensors eventually used for both seismic and PAM purposes would not be affected by any additional sound that would arise from the source 20 while they are acquiring seismic information. Thus, the method allows using the source 20 without interfering with the acoustic positioning system of the streamers.

The source 20 can be a marine mammal vocalization simulator, a marine seismic source, a marine depth-sounder, a marine transponder. The marine seismic source, such as airgun used in marine seismic exploration, depth-sounder and transponder can be diverted from their original use to perform the emission of test acoustic signals, driven by the quality control device 30.

The vocalization simulator can be installed anywhere on the overall system used for the seismic prospection, i.e. on a vessel, on a head buoy or end-tail buoy (towed, moored or drifting), on the seismic source network, or integrated on or inside the seismic streamers. The location of the source 20 is determined thanks to a positioning system, such as a GPS (Global Positioning System), an AIS (Automatic Identification System) or an acoustic positioning system. The vocalization simulator can also be installed on a independent device such as an underwater unmanned vehicle eventually equipped with seismic equipments, an ocean bottom node disposed on the seafloor, or on a dedicated device immerged at known location and depth from the PAM system 10.

For the purposes of pedagogical description, the method described above involves only one given source driven by the quality control device. Of course, a greater number of sources driven by the quality control device can be used in order to improve the performances of the method according to an exemplary embodiment of the invention, as explained below.

Let us take a set of three sources for example, each source being located in a distinct location and emitting a test acoustic signal. An iteration of the steps 100 to 140 (loop (a) in FIG. 1) is carried out for each of the three sources concerned, the quality control device 30 carrying out the steps 100, 130 and 140. An astute choice of location of the different sources as a function of the reception radiation pattern of the PAM system 10 can be thus carried out in order to enhance the control of quality of operation of the PAM system 10.

According to another particularity of an exemplary embodiment of the invention, each source uses a distinct emission frequency range. In that case, an iteration of the steps 100 to 140 (loop (a) in FIG. 1) is carried out for each of the three sources concerned, the quality control device 30 carrying out the steps 100, 130 and 140 simultaneously for the set of three sources. This enables to execute multiple quality control processes in parallel.

It should be noted that for marine mammals, especially cetaceans (including mysticetes and odontocetes), the sound production can be notably identified as a function of emission frequencies. The whole sound production of cetaceans includes very low frequencies emissions of mysticetes, medium frequencies emissions of odontocetes (whistles) and high frequencies emissions of odontocetes (clicks). Thus, by emitting at the same time different test acoustic signals each simulating for example a vocalization in a distinct frequency range, it is possible to implement the method more efficiently.

The quality control device 30 according to an exemplary embodiment of the invention is also capable of adjusting automatically some of characteristics defining the step 110 of obtaining acoustic signal measurements and the step 120 of estimating parameters by means of an optimization process, as described hereafter. This allows taking into account characteristics that may dynamically change in time.

To optimize parameters of the PAM system, we may envisage for example to execute several iterations of the steps 100 to 140 (loop (a) in FIG. 1) for the source 20, with at least one characteristic defining said step 110 of obtaining acoustic signal measurements which is different for each iteration. For example, we may adjust automatically Fast Fourier Transform parameters or gain for different frequency bandwidth, for each iteration.

To optimize parameters of the PAM system, we may also envisage for example to execute several iterations of the steps 110 to 140 (loop (b) in FIG. 1) for the source 20, with at least one characteristic defining said step 120 of estimating which is different for each iteration. The optimization process consists here in replaying measurements acquired by the PAM system 10 after having changed at least one characteristic defining said step of estimating. For example, we may adjust automatically Fast Fourier Transform parameters or gain for a specific frequency bandwidth, for each iteration.

In addition, we may envisage that the device 30 carries out false alarm measurement. While the source 20 is turned off, the device 30 takes this opportunity to trigger a step of acoustic signal measurements by the PAM system in order to record the number of false alarms detected per time unit (this number of false alarms is referred as a false alarm probability). This avoids that a non-detection is systematically attributed to a non-emission of a test acoustic signal by the source 20.

The quality information obtained in step 140 belongs to the group comprising: DCL ("Detection, Classification, Localization") performances. Those information are used notably to calibrate functions of the PAM system 10.

The method according to an exemplary embodiment of the invention allows determining notably:

for the detection function:
  the false alarm probability (per sensor, per group of sensors or globally for the network of sensors);
  the detection probability as a function of the distance (or "offset") between the seismic source shot and the test acoustic signal, of the emission source distance, of the characteristics of test acoustic signal;

for the localization function:
  the bearing accuracy and precision as a function of the offset between the seismic source shot and the test acoustic signal, of the emission source distance, of the characteristics of test acoustic signal;
  the range accuracy and precision as a function of the offset between the seismic source shot and the test acoustic signal, of the emission source distance, of the characteristics of test acoustic signal;
  The location uncertainty accuracy and precision as a function of the offset between the seismic source shot and the test acoustic signal, of the emission source distance, of the characteristics of test acoustic signal.

Figure 5:
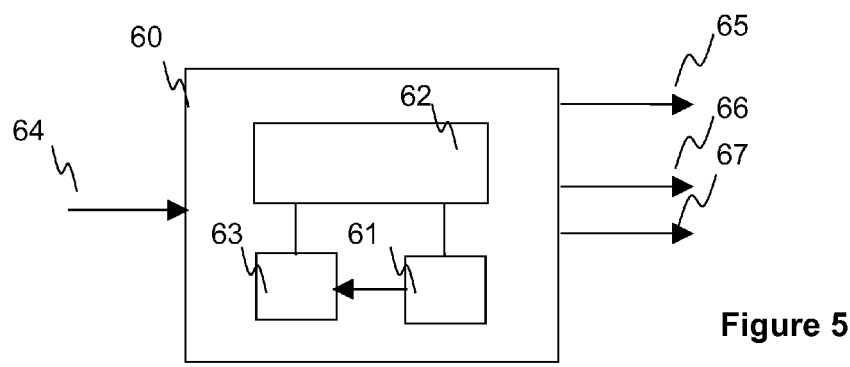
FIG. 5 shows the simplified structure of a quality control device according to a particular embodiment of the invention.

FIG. 5 shows the simplified structure of a quality control device (or a machine) according to a particular embodiment of the invention, which carries out the steps 100, 130 and 140 of method shown in FIG. 1. This device is comprised for example in the PAM system).

The device 60 comprises a non-volatile memory 61 (e.g. a read-only memory (ROM) or a hard disk), a volatile memory 63 (e.g. a random access memory or RAM) and a processor 62. The non-volatile memory 61 is a non-transitory computer-readable carrier medium. It stores executable program code instructions, which are executed by the processor 62 in order to enable implementation of the quality control method described above in relation with FIG. 1.

Upon initialization, the aforementioned program code instructions are transferred from the non-volatile memory 61 to the volatile memory 63 so as to be executed by the processor 62. The volatile memory 63 likewise includes registers for storing the variables and parameters required for this execution.

The device 60 receives as inputs, from the PAM system, estimated parameters 64 characteristic of and/or associated with the test acoustic signal emitted by the source. It generates as outputs quality information 65 as described above.

The device 60 also generates as outputs an emission command 66 to the source in order to trigger the emission of a test acoustic signal and a measurement command 67 to the PAM system in order to trigger the execution of acoustic signal measurements and to synchronize the measurements with the emission of the test acoustic signal, as described above.

All the steps of the above steering method can be implemented equally well:
  by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or by a dedicated machine or component, such as an FPGA (Field Programmable Gate Array), an ASIC (Application-Specific Integrated Circuit) or any dedicated hardware component.

In other words, the invention is not limited to a purely software-based implementation, in the form of computer program instructions, but that it can also be implemented in hardware form or any form combining a hardware portion and a software portion.

An exemplary embodiment of the present disclosure provides a technique for controlling quality of operation of a PAM system, this technique being executed automatically without requiring any operator on source side or on PAM side.

An embodiment of the disclosure provides a technique of this kind that allows real time running during the seismic survey.

An embodiment of the disclosure provides a technique of this kind that allows taking into account the real acoustic conditions during the seismic surveys.

An embodiment of the disclosure provides a technique of this kind that allows providing high-quality information.

Although the present disclosure has been described with reference to one or more examples, workers skilled in the art will recognize that changes may be made in form and

The invention claimed is:

1. A method for controlling quality of operation of a passive acoustic monitoring system having a control unit, said method comprising, at least for one given source:
   a) said given source emits at least one acoustic test signal;
   b) the passive acoustic monitoring system obtains acoustic signal measurements and estimates at least one parameter, characteristic of and/or associated with said at least one test acoustic signal, as a function of said acoustic signal measurements;
   c) comparing the at least one estimated parameter with at least one reference parameter, characteristic of and/or associated with said at least one test acoustic signal;
   d) obtaining at least one piece of quality information of operation of the passive acoustic monitoring system, as a function of results of said comparing step; and
   wherein a quality control device performs:
      1) transmitting an emission command to the source to trigger said step a), and transmitting a measurement command to the control unit of the passive acoustic monitoring system;
      2) obtaining said at least one estimated parameter; and
      3) carrying-out said step c) so that the quality control device compares said at least one estimated parameter with said at least one reference parameter, and carrying-out said step d) so that the quality control device obtains said at least one piece of quality information.

2. The method according to claim 1, wherein said quality control device belongs to the group consisting of:
   a quality control device integrated in said passive acoustic monitoring system; and
   a quality control device integrated in said given source.

3. The method according to claim 1, wherein a navigation system implements a seismic shooting session, and wherein said quality control device carries out a synchronization of said step of transmitting the emission command to the source, with said seismic shooting session.

4. The method according to claim 3, wherein the seismic shooting session comprises at least one shooting time slot and at least one non-shooting time slot, and wherein said synchronization of said step of transmitting the emission command to the source, with said seismic shooting session, is such that said at least one test acoustic signal is emitted either during said at least one shooting time slot or during said at least one non-shooting time slot.

5. The method according to claim 1, wherein an iteration of said steps a) to d) is carried out for each of at least two sources, each source being located in a distinct location, and wherein said quality control device carries out said steps 1) to 3) for each of said at least two sources.

6. The method according to claim 1, an iteration of said steps a) to d) being carried out for each of at least two sources, each source using a distinct emission frequency range, and wherein said quality control device carries out, simultaneously for said at least two sources, said steps 1) to 3).

7. The method according to claim 1, wherein said given source belongs to the group consisting of:
   a marine mammal vocalization simulator;
   a marine seismic source;
   a marine depth-sounder; and
   a marine transponder.

8. The method according to claim 1, wherein said at least one reference parameter belongs to the group consisting of:
   characteristics of said at least one test acoustic signal;
   an emission time of said at least one test acoustic signal; and
   an emission location of said at least one source.

9. The method according to claim 1, wherein at least two iterations of said steps a) to d) and said steps 1) to 3) are carried out for said given source, with at least one characteristic of said at least one test acoustic signal which is different for each iteration.

10. The method according to claim 1, wherein at least two iterations of said steps a) to d) and said steps 1) to 3) are carried out for said given source, with at least one characteristic defining said step of obtaining acoustic signal measurements which is different for each iteration.

11. The method according to claim 1, wherein at least two iterations of said steps b) to d) and said steps 2) to 3) are carried out for said given source, with at least one characteristic defining said step of estimating which is different for each iteration.

12. A non-transitory computer-readable carrier medium storing a computer program product comprising program code instructions for implementing a method for controlling quality of operation of a passive acoustic monitoring system having a control unit, when said program is executed on a computer or a processor, said method comprising, at least for one given source:
   a) said given source emits at least one acoustic test signal;
   b) the passive acoustic monitoring system obtains acoustic signal measurements and estimates at least one parameter, characteristic of and/or associated with said at least one test acoustic signal, as a function of said acoustic signal measurements;
   c) comparing the at least one estimated parameter with at least one reference parameter, characteristic of and/or associated with said at least one test acoustic signal;
   d) obtaining at least one piece of quality information of operation of the passive acoustic monitoring system, as a function of results of said comparing step; and wherein a quality control device, which comprises the computer or processor executing the instructions, performs:
1) transmitting an emission command to the source to trigger said step a), and transmitting a measurement command to the control unit of the passive acoustic monitoring system;
2) obtaining said at least one estimated parameter; and
3) carrying-out said step c) so that the quality control device compares said at least one estimated parameter with said at least one reference parameter, and carrying-out step d) so that the quality control device obtains said at least one piece of quality information.

13. A quality control device adapted to control quality of operation of a passive acoustic monitoring system having a control unit, the device comprising:
   means for transmitting an emission command to a given source to trigger emission of at least one acoustic test signal by said given source and for transmitting a measurement command to the control unit of the passive acoustic monitoring system;
   means for obtaining at least one parameter, characteristic of and/or associated with said at least one test acoustic signal, estimated by the passive acoustic monitoring system as a function of acoustic signal measurements obtained by the passive acoustic monitoring system;
   means for comparing the at least one estimated parameter with at least one reference parameter, characteristic of and/or associated with said at least one test acoustic signal; and
   means for obtaining at least one piece of quality information of operation of the passive acoustic monitoring system, as a function of results delivered by said comparing means.

* * * * *